(12) United States Patent
Bian

(10) Patent No.: US 12,386,117 B2
(45) Date of Patent: Aug. 12, 2025

(54) POLARIZATION ROTATORS WITH OVERLAPPING WAVEGUIDE CORES

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 301 days.

(21) Appl. No.: 17/941,055

(22) Filed: Sep. 9, 2022

(65) Prior Publication Data
US 2024/0085626 A1  Mar. 14, 2024

(51) Int. Cl.
| G02B 6/126 | (2006.01) |
| G02B 6/12 | (2006.01) |
| G02B 6/122 | (2006.01) |
| G02B 6/13 | (2006.01) |

(52) U.S. Cl.
CPC ........... *G02B 6/126* (2013.01); *G02B 6/1228* (2013.01); *G02B 6/13* (2013.01); *G02B 2006/12061* (2013.01)

(58) Field of Classification Search
CPC ........ G02B 6/126; G02B 6/2766; G02B 6/13; G02B 2006/12061
See application file for complete search history.

(56) References Cited

U.S. PATENT DOCUMENTS

| 8,873,899 | B2 * | 10/2014 | Anderson | G02B 6/2773 385/11 |
| 9,122,006 | B1 | 9/2015 | Roth et al. | |
| 10,429,581 | B1 | 10/2019 | Thomas et al. | |
| 10,641,956 | B1 | 5/2020 | Bian et al. | |
| 10,816,728 | B1 | 10/2020 | Bian et al. | |
| 10,996,398 | B1 | 5/2021 | Bian et al. | |
| 11,125,944 | B2 | 9/2021 | Bian et al. | |
| 11,221,506 | B2 | 1/2022 | Shank et al. | |

(Continued)

OTHER PUBLICATIONS

Aktas et al. "Nonlinear properties of laser-processed polycrystalline silicon waveguides for integrated photonics", Optics Express, 2020. (Year: 2020).*

(Continued)

*Primary Examiner* — Thomas A Hollweg
*Assistant Examiner* — Kirsten D. Endresen
(74) *Attorney, Agent, or Firm* — Thompson Hine LLP; Anthony Canale

(57) ABSTRACT

Structures for a polarization rotator and methods of forming a structure for a polarization rotator. The structure comprises a first waveguide core having a first section, a second section, a first terminating end, and a second terminating end opposite to the first terminating end. The first and second sections of the first waveguide core are arranged between the first terminating end and the second terminating end. The structure further comprises a second waveguide core including a first tapered section having a first overlapping arrangement with the first section of the first waveguide core and a second tapered section having a second overlapping arrangement with the second section of the first waveguide core. The first waveguide core comprises a first material, and the second waveguide core comprises a second material different from the first material.

19 Claims, 12 Drawing Sheets

(56) References Cited

U.S. PATENT DOCUMENTS

| | | | | |
|---|---|---|---|---|
| 2002/0164876 | A1* | 11/2002 | Walitzki | H01L 21/2007 438/692 |
| 2012/0163750 | A1* | 6/2012 | Chen | B29D 11/00644 385/11 |
| 2018/0059324 | A1* | 3/2018 | Tu | G02B 6/2766 |
| 2022/0120966 | A1* | 4/2022 | Liu | G02B 6/13 |
| 2022/0373738 | A1* | 11/2022 | Bian | G02B 6/125 |

OTHER PUBLICATIONS

Long Chen, Christopher R. Doerr, and Young-Kai Chen, "Compact polarization rotator on silicon for polarization-diversified circuits," Optics Letters 36, 469-471 (2011).

Wesley D. Sacher, Ying Huang, Liang Ding, Tymon Barwicz, Jared C. Mikkelsen, Benjamin J. F. Taylor, Guo-Qiang Lo, and Joyce K. S. Poon, "Polarization rotator-splitters and controllers in a Si3N4—on-SOI integrated photonics platform," Optics Express 22, 11167-11174 (2014).

Wesley D. Sacher, Tymon Barwicz, Benjamin J. F. Taylor, and Joyce K. S. Poon, "Polarization rotator-splitters in standard active silicon photonics platforms," Optics Express 22, 3777-3786 (2014).

Yunhong Ding, Haiyan Ou, and Christophe Peucheret, "Wideband polarization splitter and rotator with large fabrication tolerance and simple fabrication process, " Optics Letters 38, 1227-1229 (2013).

X. Sun, M. Z. Alam, J. S. Aitchison, and M. Mojahedi, "Polarization rotator based on augmented low-index-guiding waveguide on silicon nitride/silicon-on-insulator platform," Optics Letters 41, 3229-3232 (2016).

Sylvain Guerber, Carlos Alberto Alonso-Ramos, Xavier Le Roux, Nathalie Vulliet, Eric Cassan, Delphine Marris-Morini, Frédéric Boeuf, and Laurent Vivien, "Polarization independent and temperature tolerant AWG based on a silicon nitride platform," Optics Letters 45, 6559-6562 (2020).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A CMOS Compatible Monolithic Fiber Attach Solution with Reliable Performance and Self-alignment," In Optical Fiber Communication Conference (OFC) 2020, OSA Technical Digest (Optica Publishing Group, 2020), paper Th31.4.

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

W. S. Lee, Y. Bian, T. Weeks, M. Rakowski, F. O. Afzal, T. Hirokawa, A. Chowdhury, R. Augur, J. G. Lee, A. Martin, and K. Giewont, "Automatic Waveguide Balancing Using Point Set Operations," in Optical Fiber Communication Conference (OFC) 2022, S. Matsuo, D. Plant, J. Shan Wey, C. Fludger, R. Ryf, and D. Simeonidou, eds., Technical Digest Series (Optica Publishing Group, 2022), paper M3E.2.

Bian, Yusheng et al., "Switchable Polarization Rotators" filed on May 24, 2021 as a U.S. Appl. No. 17/328,048.

* cited by examiner

POLARIZATION ROTATORS WITH OVERLAPPING WAVEGUIDE CORES

BACKGROUND

The disclosure relates to photonics chips and, more specifically, to structures for a polarization rotator and methods of forming a structure for a polarization rotator.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

Polarization rotators are a type of optical component commonly found in photonics chips. A polarization rotator may be configured to receive optical signals of a given polarization state (e.g., the fundamental transverse magnetic (TM0) polarization) as input and to output a different polarization state (e.g., the fundamental transverse electric (TE0) polarization). Conventional polarization rotators may suffer from a high conversion loss and significant polarization crosstalk that contribute to less than desirable performance.

Improved structures for a polarization rotator and methods of forming a structure for a polarization rotator are needed.

SUMMARY

In an embodiment of the invention, a structure for a polarization rotator is provided. The structure comprises a first waveguide core having a first section, a second section, a first terminating end, and a second terminating end opposite to the first terminating end. The first and second sections of the first waveguide core are arranged between the first terminating end and the second terminating end. The structure further comprises a second waveguide core including a first tapered section and a second tapered section. The first tapered section of the second waveguide core has a first overlapping arrangement with the first section of the first waveguide core, and the second tapered section of the second waveguide core has a second overlapping arrangement with the second section of the first waveguide core. The first waveguide core comprises a first material, and the second waveguide core comprises a second material different from the first material.

In an embodiment of the invention, a method of forming a structure for a polarization rotator is provided. The method comprises forming a first waveguide core having a first section, a second section, a first terminating end, and a second terminating end opposite to the first terminating end. The first section and the second section of the first waveguide core are arranged between the first terminating end and the second terminating end. The method further comprises forming a second waveguide core including a first tapered section and a second tapered section. The first tapered section of the second waveguide core has a first overlapping arrangement with the first section of the first waveguide core, and the second tapered section of the second waveguide core has a second overlapping arrangement with the second section of the first waveguide core. The first waveguide core comprises a first material, and the second waveguide core comprises a second material different from the first material.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
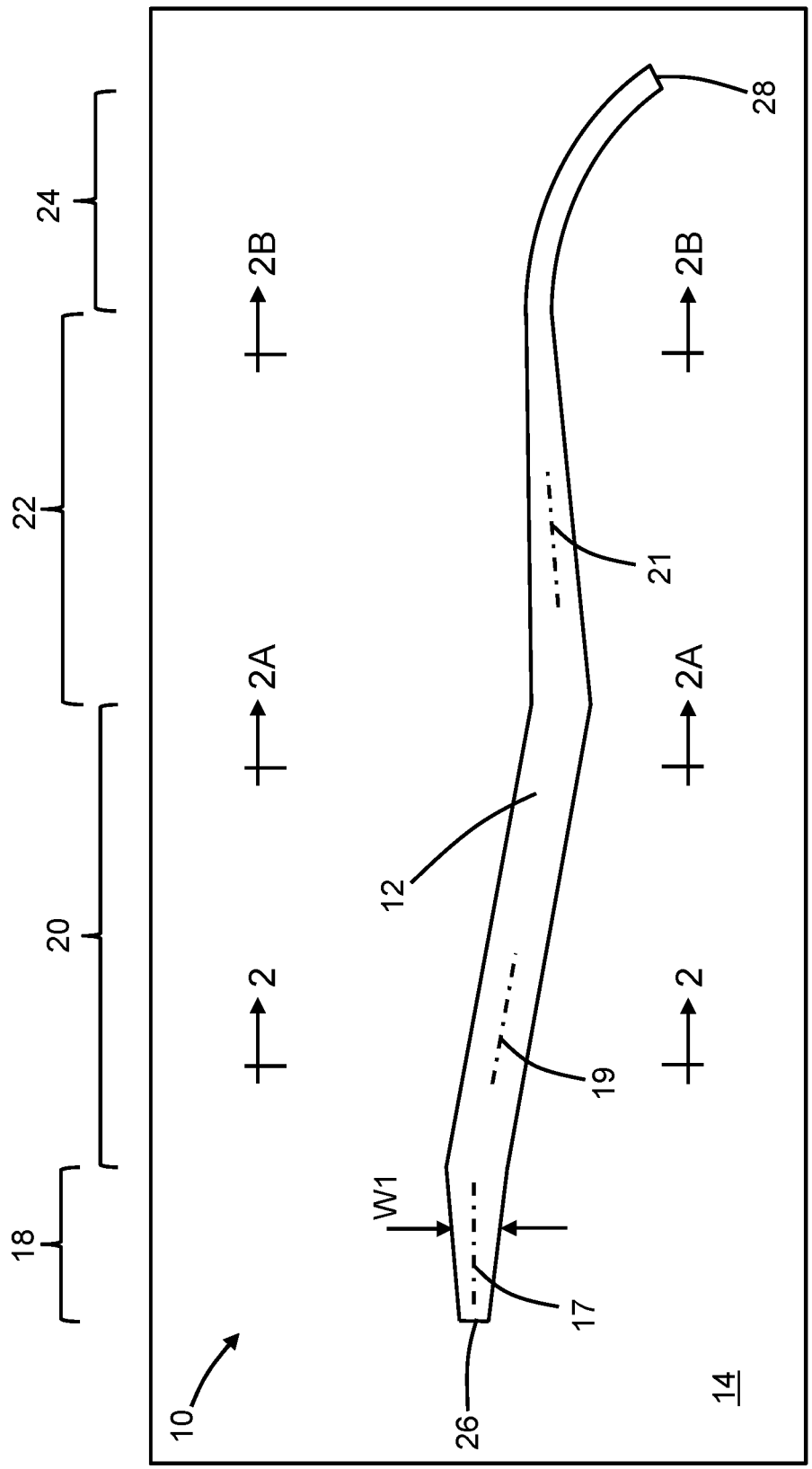
FIG. 1 is a top view of a structure at an initial fabrication stage of a processing method in accordance with embodiments of the invention.
Figure 2:
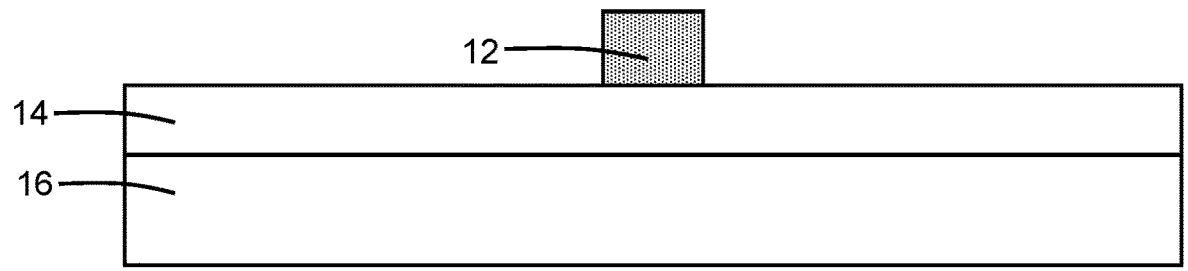
FIG. 2 is a cross-sectional view of the structure taken generally along line 2-2 in FIG. 1.
Figure 2A:
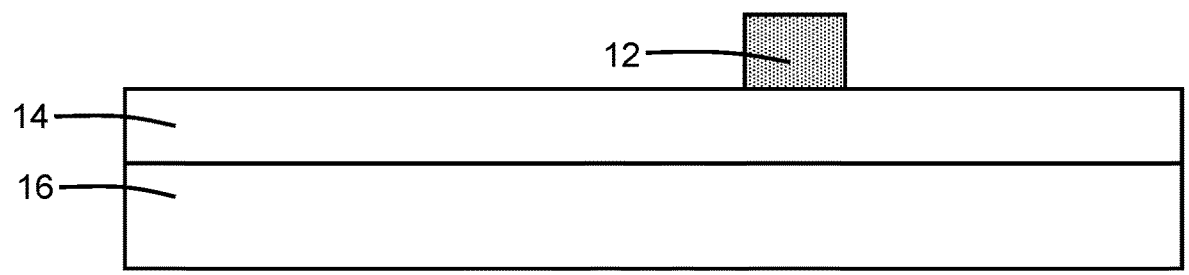
FIG. 2A is a cross-sectional view of the structure taken generally along line 2A-2A in FIG. 1.
Figure 2B:
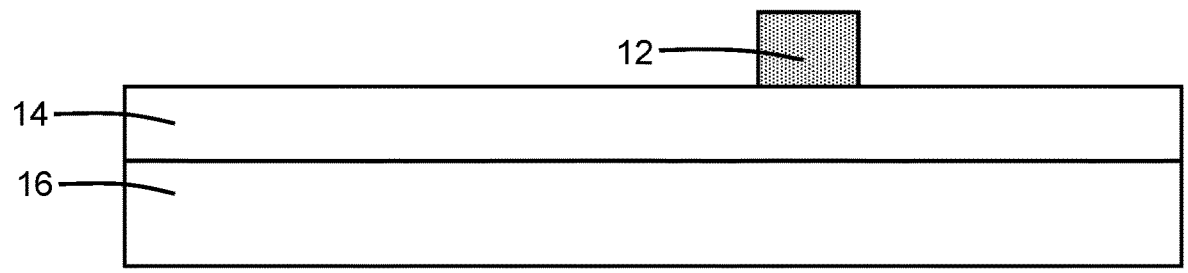
FIG. 2B is a cross-sectional view of the structure taken generally along line 2B-2B in FIG. 1.
Figure 3:
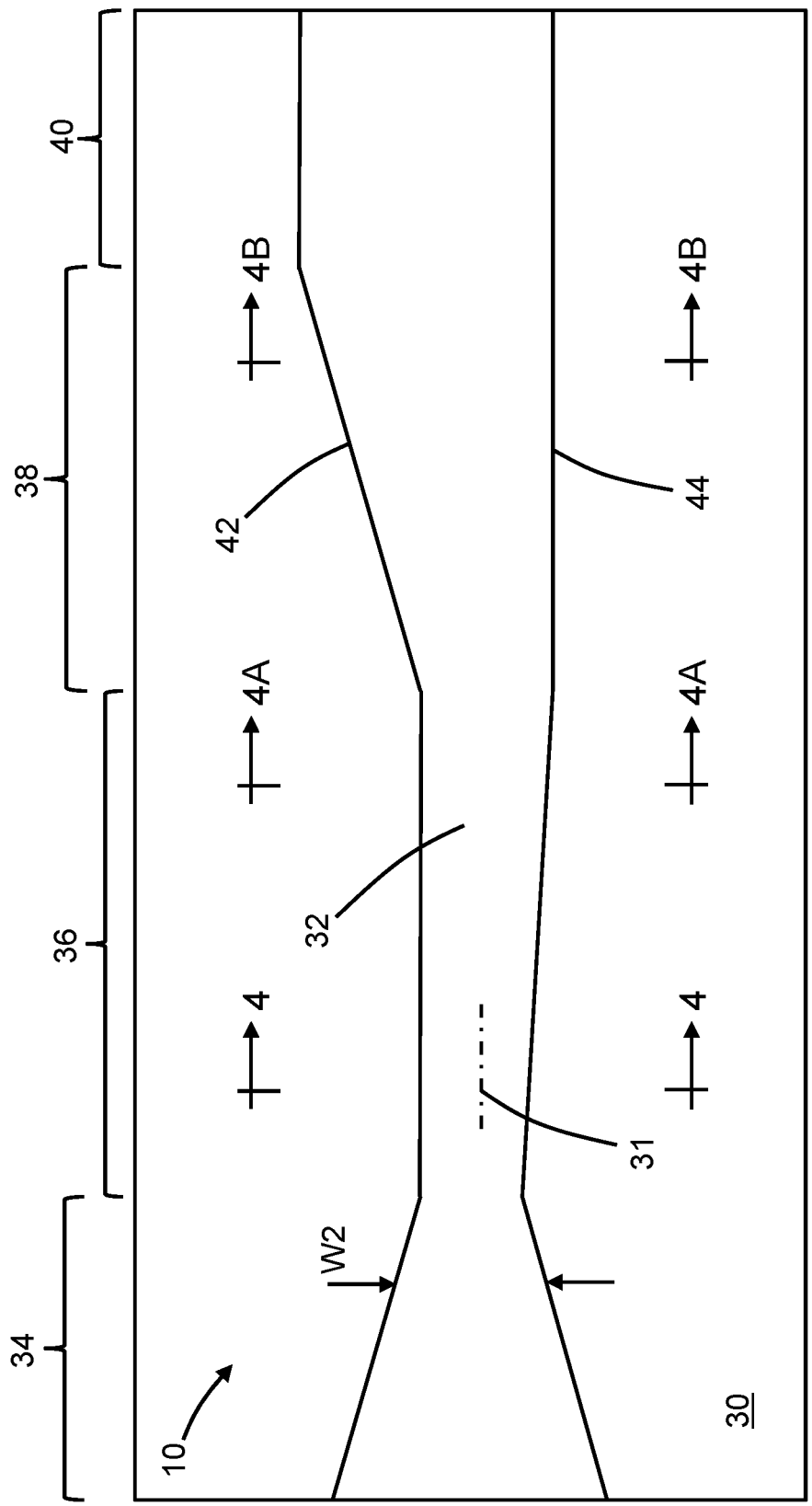
FIG. 3 is a top view of the structure at a fabrication stage subsequent to FIG. 1.

With reference to FIGS. 1, 2, 2A, 2B and in accordance with embodiments of the invention, a structure 10 for a polarization rotator includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, one or more additional dielectric layers comprised of, for example, silicon dioxide may separate the waveguide core 12 from the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon or polysilicon. In an alternative embodiment, the waveguide core 12 may be comprised of a dielectric material, such as silicon nitride, silicon oxynitride, or aluminum nitride. In alternative embodiments, other materials, such as a polymer or a III-V compound semiconductor, may be used to form the waveguide core 12.

In an embodiment, the waveguide core 12 may be formed by patterning a layer comprised of a material with lithography and etching processes. In an embodiment, an etch mask may be formed by a lithography process over the layer, and unmasked sections of the deposited layer may be etched and removed with an etching process. The shape of the etch mask determines the patterned shape of the waveguide core 12. In an embodiment, the waveguide core 12 may be formed by patterning the semiconductor material (e.g., single-crystal silicon) of a device layer of a silicon-on-insulator substrate. In an embodiment, the waveguide core 12 may be formed by patterning a deposited layer comprised of the material (e.g., polysilicon).

The waveguide core 12 includes a section 18, a section 20 adjoined to the section 18, a section 22 adjoined to the section 20, and a section 24 adjoined to the section 22. The section 20 is longitudinally arranged between the section 18 and the section 22, and the section 20 may connect the section 18 to the section 22. The waveguide core 12 has a finite length extending between a terminating end 26 and a terminating end 28 opposite to the terminating end 26. The section 18 is aligned along a longitudinal axis 17, the section 20 is aligned along a longitudinal axis 19, and the section 22 is aligned along a longitudinal axis 21. The longitudinal axis 17 of the section 18 is slanted (i.e., angled) relative to the longitudinal axis 19 of the section 20 to provide a directional change at the junction between the section 18 and the section 20. The longitudinal axis 19 of the section 20 is slanted (i.e., angled) relative to the longitudinal axis 21 of the section 22 to provide a directional change at the junction between the section 20 and the section 22. The directional change at the junction transitioning from the section 20 to the section 22 defines a shallow corner at which the angular orientation between the longitudinal axis 19 and longitudinal axis 21 changes. In an embodiment, the section 24 may be a bend that curves away from the longitudinal axis 21 of the section 22.

The waveguide core 12 may have a width dimension W1 that varies over its length. In an embodiment, each of the sections 18, 20, and 22 of the waveguide core 12 may be tapered. In an embodiment, the width dimension W1 of the section 18 of the waveguide core 12 may increase with increasing distance from the terminating end 26. In an embodiment, the width dimension W1 of the section 20 and the section 22 of the waveguide core 12 may decrease with increasing distance from the terminating end 26. The section 20 and the section 22 may taper in an opposite direction from the tapering of the section 18. In an embodiment, the section 18, the section 20, and the section 22 may linearly taper and have uniform taper angles. In an embodiment, the taper angle (i.e., width change) of the section 20 may be significantly less than the taper angle of the section 22. In an alternative embodiment, the width dimension W1 of the section 20 of the waveguide core 12 may be constant.

With reference to FIGS. 3, 4, 4A, 4B in which like reference numerals refer to like features in FIGS. 1, 2, 2A, 2B and at a subsequent fabrication stage, a dielectric layer 30 is formed over the waveguide core 12. The dielectric layer 30 may be comprised of a dielectric material, such as silicon dioxide, having a refractive index that is less than the refractive index of the material constituting the waveguide core 12. The waveguide core 12 is embedded in the dielectric layer 30, which may be deposited and planarized after deposition, because the dielectric layer 30 is thicker than the height of the waveguide core 12.

The structure 10 further includes a waveguide core 32 that is positioned on the dielectric layer 30. The waveguide core 32 may be formed by depositing a layer on the dielectric layer 30 and patterning the deposited layer with lithography and etching processes. In an embodiment, an etch mask may be formed by a lithography process over the deposited layer, and unmasked sections of the deposited layer may be etched and removed with an etching process. The shape of the etch mask determines the patterned shape of the waveguide core 32.

In an embodiment, the waveguide core 32 may be comprised of a material having a refractive index that is greater than the refractive index of silicon dioxide. In an embodiment, the waveguide core 32 may be comprised of a different material than the waveguide core 12. In an embodiment, the waveguide core 32 may be comprised of a dielectric material, such as silicon nitride, aluminum nitride, or silicon oxynitride. In an alternative embodiment, the waveguide core 32 may be comprised of a semiconductor material, such as polysilicon or amorphous silicon. In alternative embodiments, other materials, such as a polymer or a III-V compound semiconductor, may be used to form the waveguide core 32.

The waveguide core 32 includes a section 34, a section 36 adjoined to the section 34, a section 38 adjoined to the section 36, and a section 40 adjoined to the section 38. The section 36 and the section 38 are longitudinally arranged between the section 34 and the section 40. The waveguide core 32 is generally aligned along a longitudinal axis 31 has a sidewall 42 and a sidewall 44 opposite to the sidewall 42. The section 34 may define a light input of the polarization rotator, and the section 40 may define a light output of the polarization rotator.

The waveguide core 32 may have a width dimension W2 that varies over its length. In an embodiment, the section 34, the section 36, and the section 38 of the waveguide core 32 may taper. In an embodiment, the width dimension W2 of the section 34 of the waveguide core 32 may decrease with decreasing distance from the junction transitioning from the section 34 to the section 36. In an embodiment, the width dimension W2 of the section 36 may increase with increasing distance from the junction transitioning from the section 36 to the section 34. In an embodiment, the width dimension W2 of the section 38 of the waveguide core 32 may increase with increasing distance from the junction transitioning from the section 38 to the section 36. The section 38 tapers in the same direction as the section 36 but with a larger taper angle to provide a compound taper. The section 36 and the section 38 each taper in an opposite direction from the section 34. The sections 34, 36 and 38 of the waveguide core 32 define consecutive tapered sections. In an embodiment, the width dimension W2 of the section 40 of the waveguide core 32 may be constant.

The waveguide core 12 is positioned in a vertical direction between the waveguide core 32 and the substrate 16. The section 34 of the waveguide core 32 has an overlapping arrangement with a portion of the waveguide core 12, the section 36 of the waveguide core 32 has an overlapping arrangement with a different portion of the waveguide core 12, and the section 38 of the waveguide core 32 has an overlapping arrangement with yet a different portion of the waveguide core 12.

In an embodiment, the section 34 of waveguide core 32 is positioned to overlap with the section 18 of the waveguide core 12. In an embodiment, the section 34 of waveguide core 32 may fully overlap with the section 18 of the waveguide core 12. The section 34 of the waveguide core 32 and the section 18 of the waveguide core 12 taper in opposite directions.

In an embodiment, the section 36 of waveguide core 32 is positioned to overlap with the section 20 of the waveguide core 12. The degree of overlap in the overlapping arrangement between the section 20 of the waveguide core 12 and the section 36 of waveguide core 32 decreases with increasing distance from the terminating end 26 of the waveguide core 12 (FIG. 1) as the lateral offset of the section 20 relative to the section 36 increases. In an embodiment, the section 36 may fully overlap with the section 20 adjacent to the terminating end 26, and the section 36 may partially overlap with the section 20 at the junction between the section 20 and the section 22. The increase in the lateral offset between the section 36 and the section 20 is primarily due to the slant of the longitudinal axis 19 of the section 20.

In an embodiment, the section 38 of waveguide core 32 is positioned to overlap with the section 22 of the waveguide core 12. The degree of overlap in the overlapping arrangement between the section 22 of the waveguide core 12 and the section 38 of waveguide core 32 increases with decreasing distance from the terminating end 28 of the waveguide core 12 (FIG. 1) as the lateral offset of the section 22 relative to the section 38 decreases. In an embodiment, the section 38 may partially overlap with the section 22 at the junction between the section 22 and the section 20, and the section 38 may fully overlap with the section 22 adjacent to the terminating end 28. The increase in the lateral offset between the section 38 and the section 22 is primarily due to the slant of the longitudinal axis 21 of the section 22, which differs from the slant of the longitudinal axis 19 of the section 20.

Figure 4:
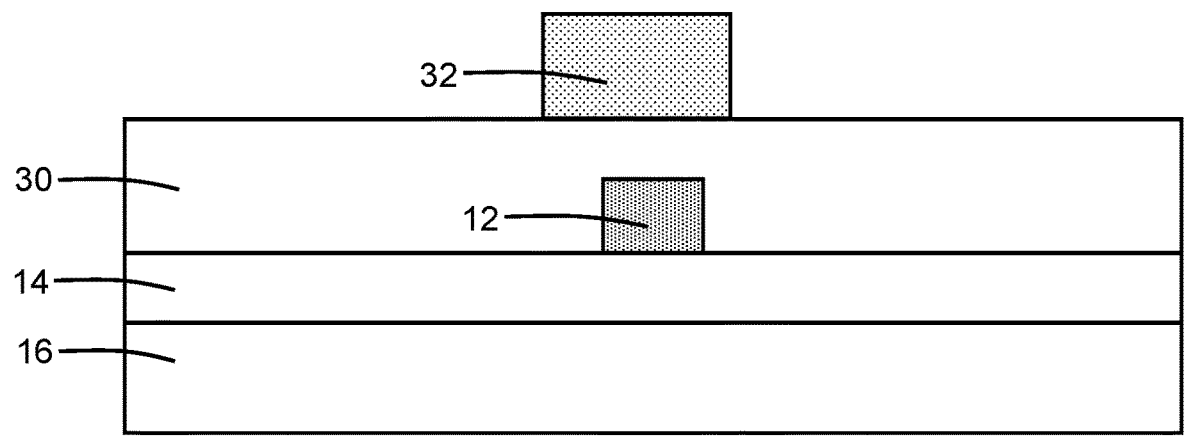
FIG. 4 is a cross-sectional view of the structure taken generally along line 4-4 in FIG. 3.
Figure 4A:
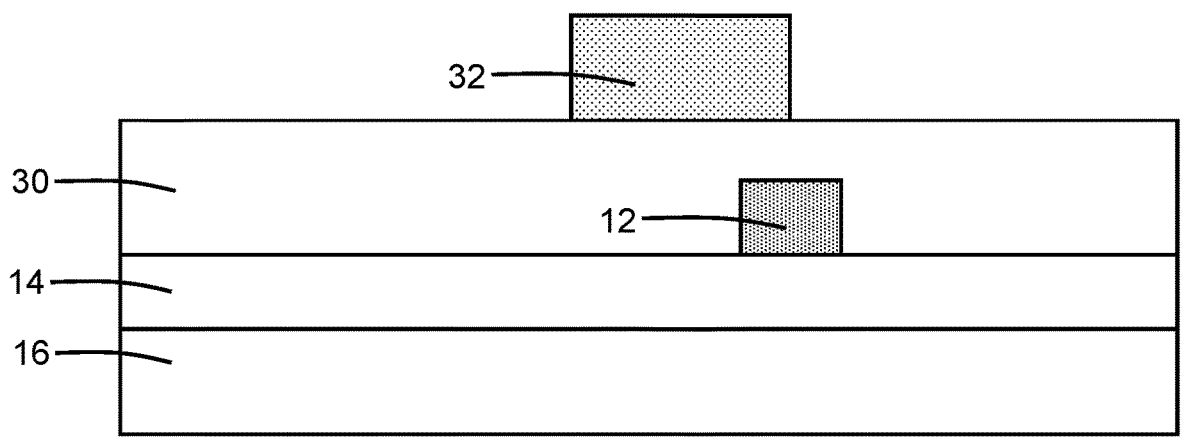
FIG. 4A is a cross-sectional view of the structure taken generally along line 4A-4A in FIG. 3.
Figure 4B:
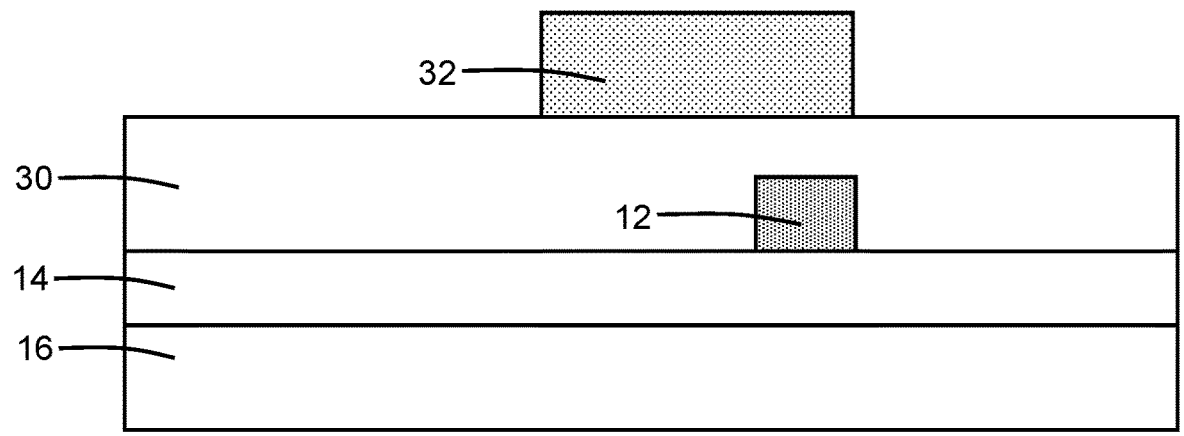
FIG. 4B is a cross-sectional view of the structure taken generally along line 4B-4B in FIG. 3.
Figure 5:
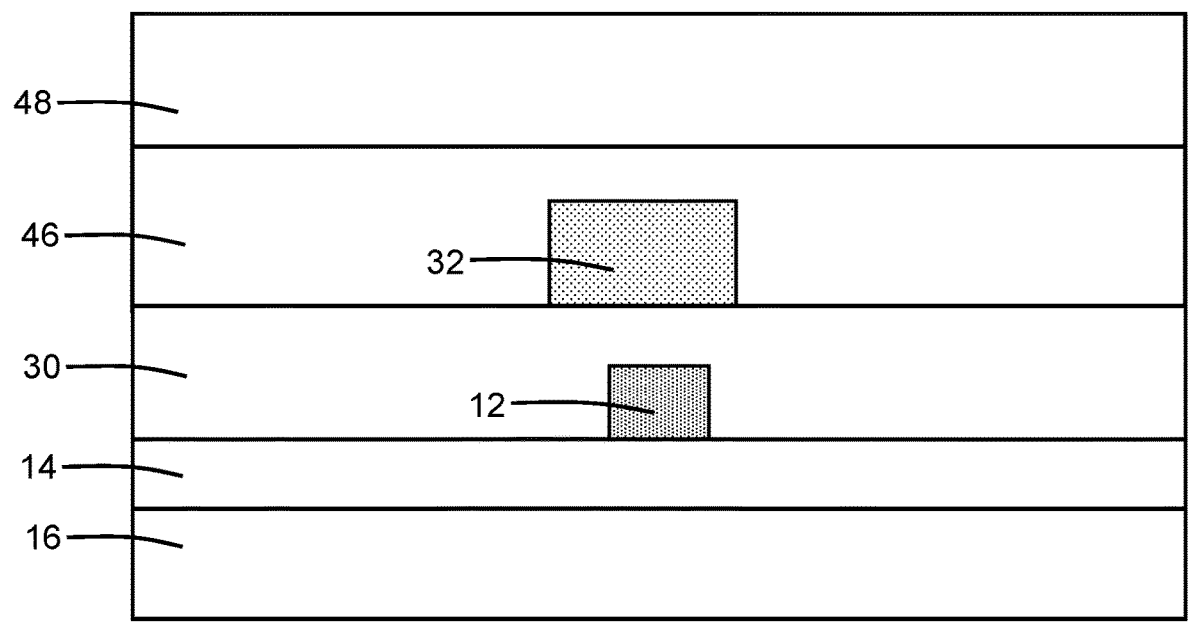
FIGS. 5, 5A, 5B are cross-sectional views of the structure at a fabrication stage subsequent to FIGS. 4, 4A, 4B.
Figure 5A:
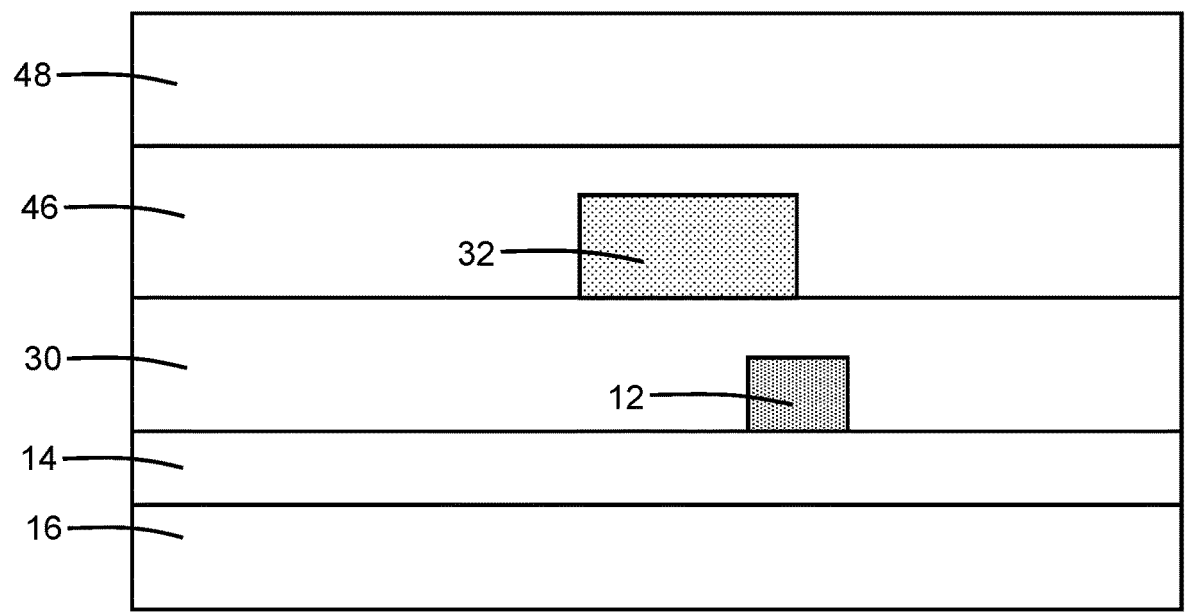
Figure 5B:
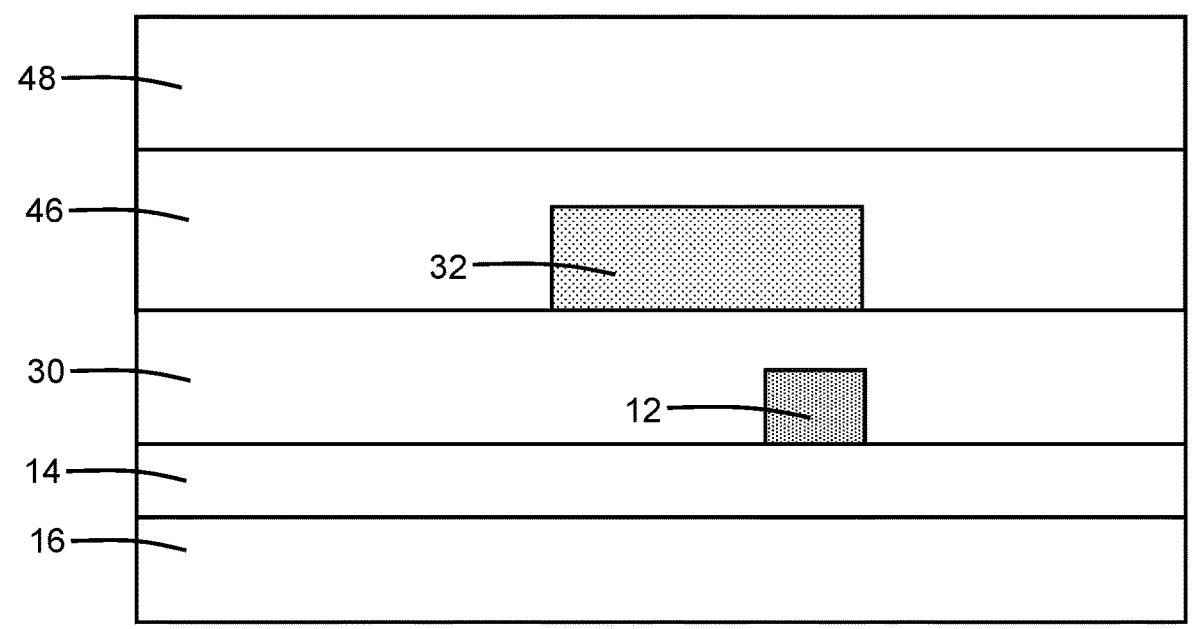

With reference to FIGS. 5, 5A, 5B in which like reference numerals refer to like features in FIGS. 4, 4A, 4B and at a subsequent fabrication stage, a dielectric layer 46 is formed over the waveguide core 32. The dielectric layer 46 may be comprised of a dielectric material, such as silicon dioxide, having a refractive index that is less than the refractive index of the material constituting the waveguide core 32. The waveguide core 32 is embedded in the dielectric layer 46, which may be deposited and planarized after deposition, because the dielectric layer 46 is thicker than the height of the waveguide core 32.

A back-end-of-line stack 48 may be formed over the dielectric layer 46. The back-end-of-line stack 48 may include stacked dielectric layers that are each comprised of a dielectric material, such as silicon dioxide, silicon nitride, tetraethylorthosilicate silicon dioxide, or fluorinated-tetra-ethylorthosilicate silicon dioxide.

In use, optical signals propagating with a transverse magnetic (TM) mode may be guided on a photonics chip by the waveguide core 32 for input to the structure 10. The waveguide cores 12, 32 cooperate to rotate the polarization mode of the light embodied in the optical signals from the TM mode to the transverse electric (TE) mode, which is output from the structure 10 to the waveguide core 32 for routing on the photonics chip to other optical components.

The waveguide core 12 of the polarization rotator assists with the rotation of the light polarization by the waveguide core 32 of the polarization rotator. The stacked waveguide cores 12, 32 mimic a twisted waveguide to achieve low conversion loss, suppress polarization crosstalk, improve the power handling capability of the polarization rotator, and may be seamlessly integrated with photonic integrated circuits that are based on the material (e.g., silicon nitride or polysilicon) of the waveguide core 32.

Figure 6:
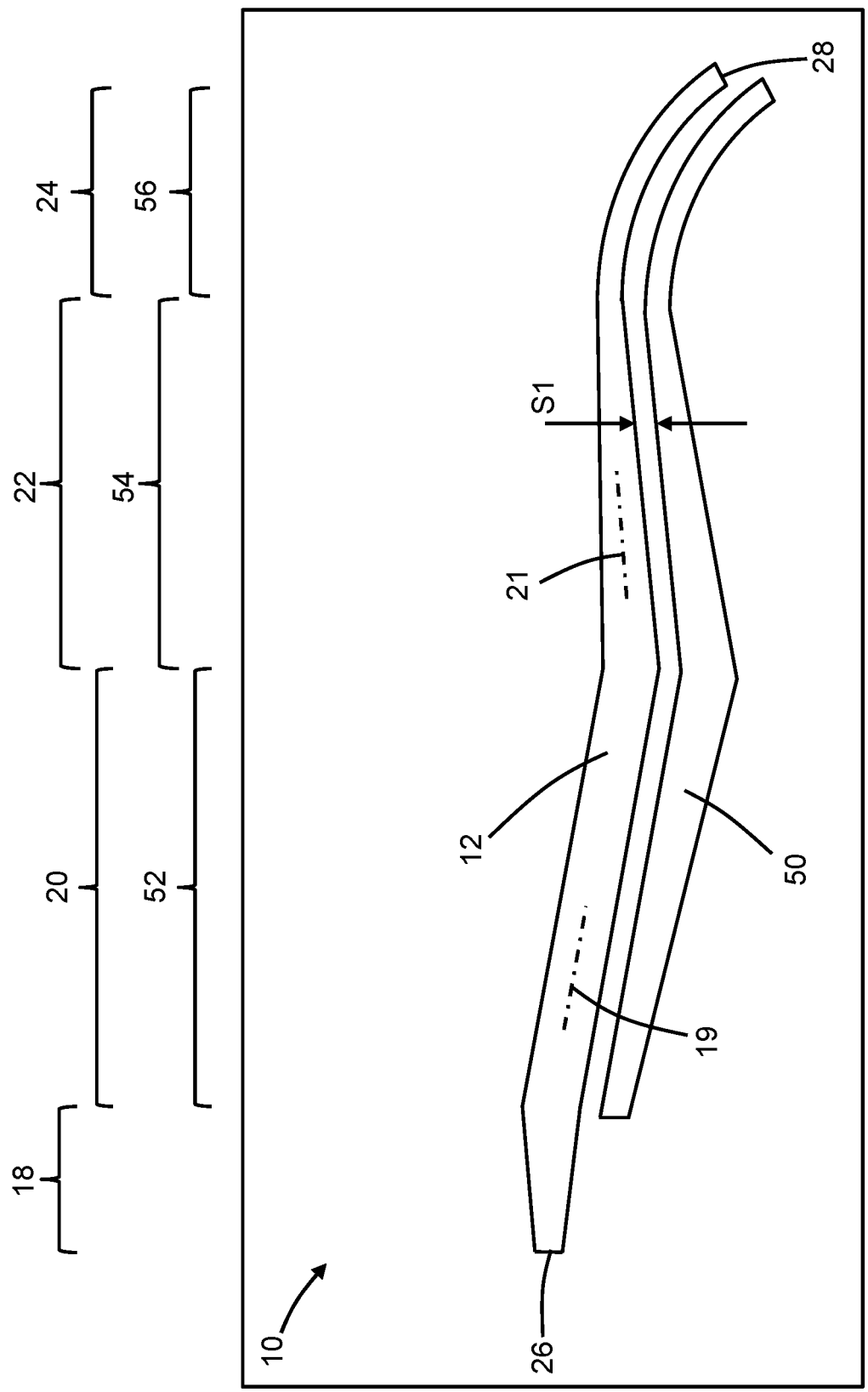
FIG. 6 is a top view of a structure at an initial fabrication stage of a processing method in accordance with alternative embodiments of the invention.

With reference to FIG. 6 and in accordance with alternative embodiments of the invention, the structure 10 may include a waveguide core 50 that is positioned adjacent to the waveguide core 12 to define a slotted waveguide core over a portion of the length of the waveguide core 12. The waveguide core 50 is separated from the waveguide core 12 by a slot S1. The waveguide core 50 includes sections 52, 54, 56 that are similar in construction to the sections 20, 22, 24 of the waveguide core 12. In an embodiment, the changes in direction at the transitions between the different sections 52, 54, 56 of the waveguide core 50 may parallel the changes in direction of the sections 20, 22, 24 of the waveguide core 12 such that the slot S1 has a constant or substantially constant width dimension over the length of the waveguide core 12. In an embodiment, the waveguide core 50 may be comprised of the same material as the waveguide core 12 and may be concurrently formed with the waveguide core 12. The waveguide core 50 may lack a section analogous to the section 18 of the waveguide core 12 in order to avoid interference with the overlap between the section 18 of the waveguide core 12 and the section 34 of the waveguide core 32. In an alternative embodiment, the slotted waveguide core may include one or more additional waveguide cores positioned adjacent to the waveguide core 50 such that the slotted waveguide core includes multiple slots.

Figure 7:
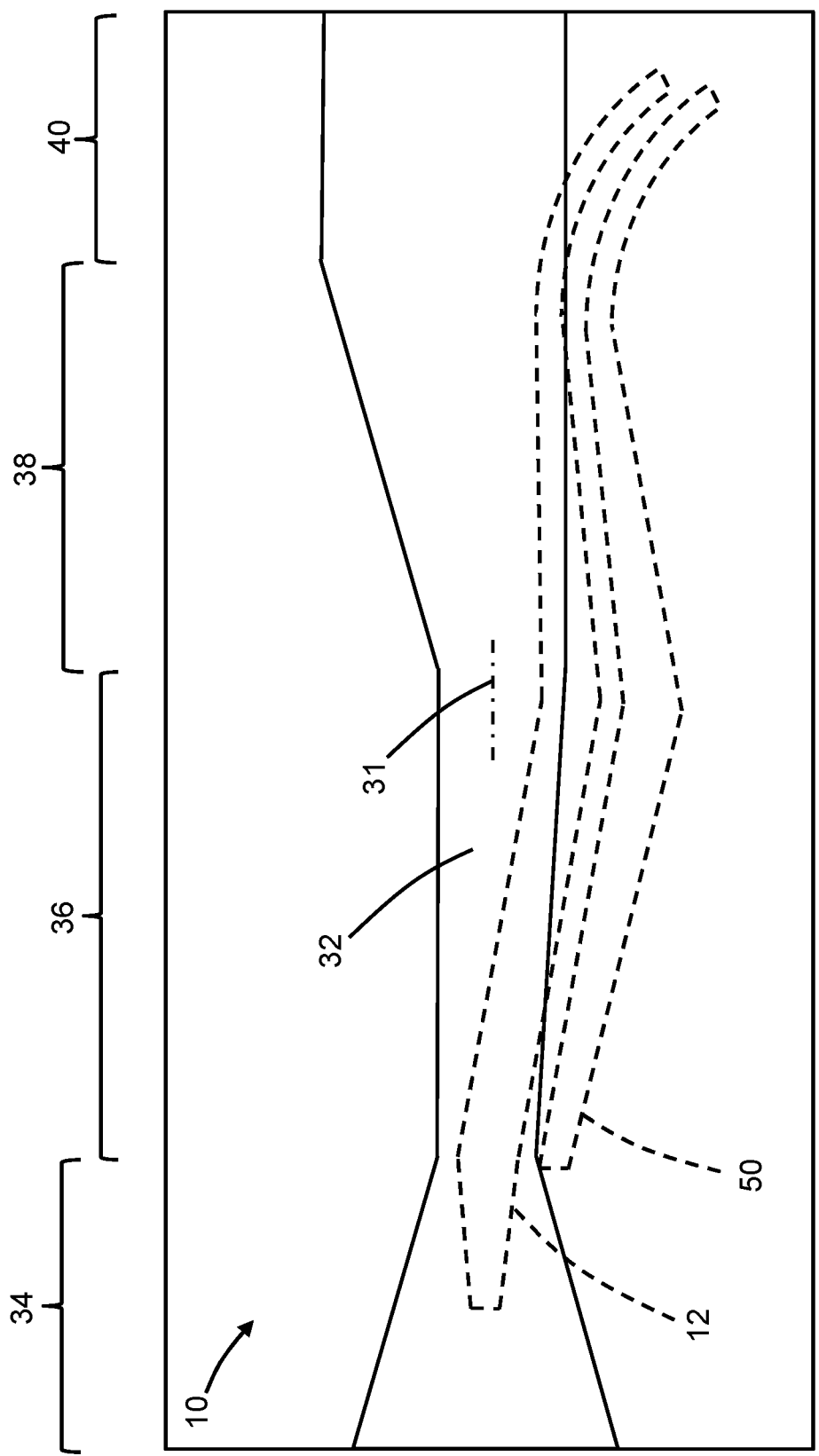
FIG. 7 is a top view of the structure at a fabrication stage subsequent to FIG. 6.

With reference to FIG. 7 in which like reference numerals refer to like features in FIG. 6 and at a subsequent fabrication stage, the dielectric layer 30 and the waveguide core 32 may be formed over the slotted waveguide core including the waveguide core 12 and the waveguide core 50. In an embodiment, the waveguide core 50 may be laterally offset from the waveguide core 12 such that the waveguide core 32 has a non-overlapping arrangement with the waveguide core 50. In an embodiment, the waveguide core 50 may be laterally offset from the waveguide core 12 such that the waveguide core 32 has a non-overlapping arrangement with the waveguide core 50 and with the slot S1 between the waveguide cores 12, 50.

Figure 8:
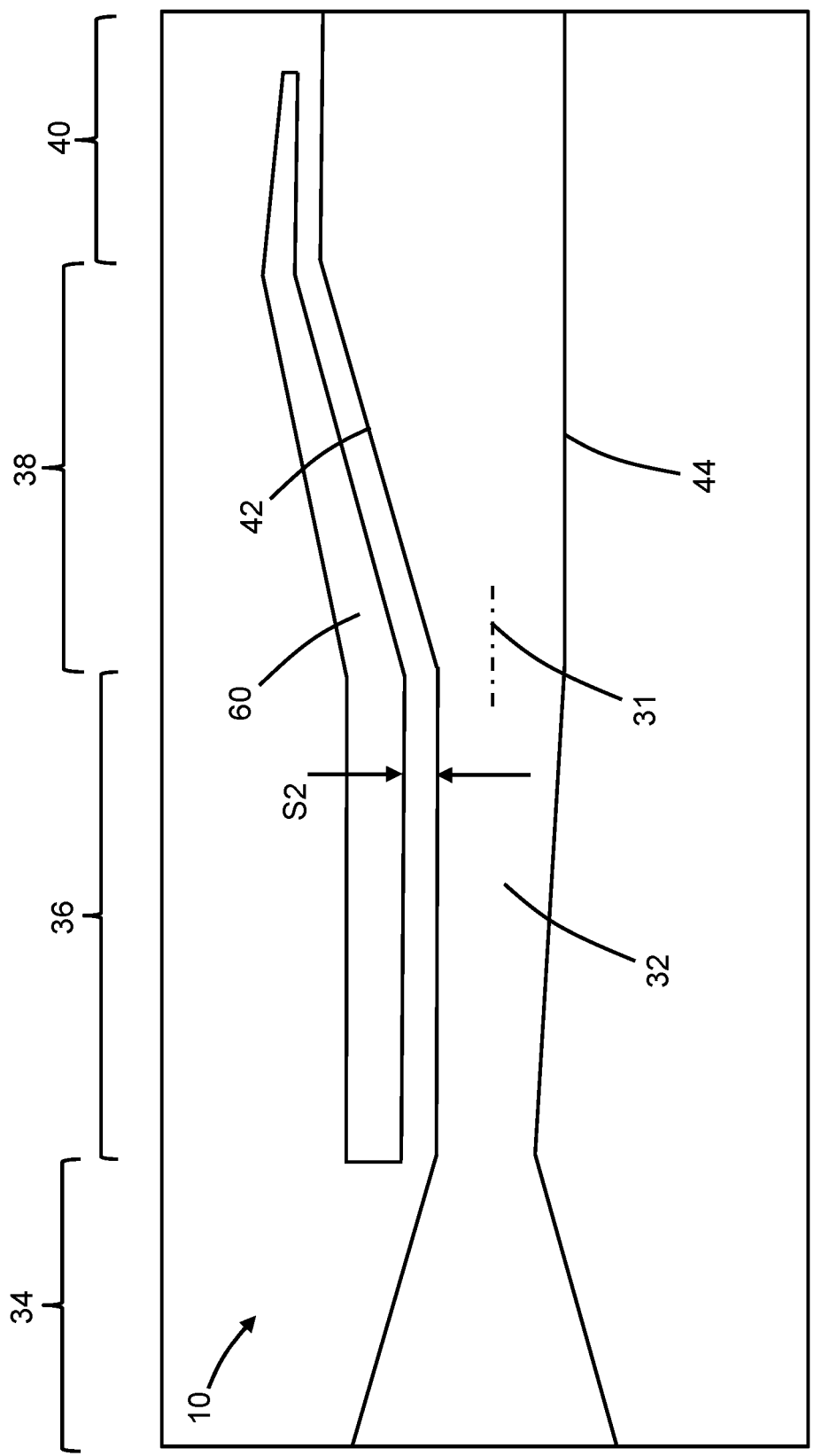
FIG. 8 is a top view of a structure in accordance with alternative embodiments of the invention.
Figure 9:
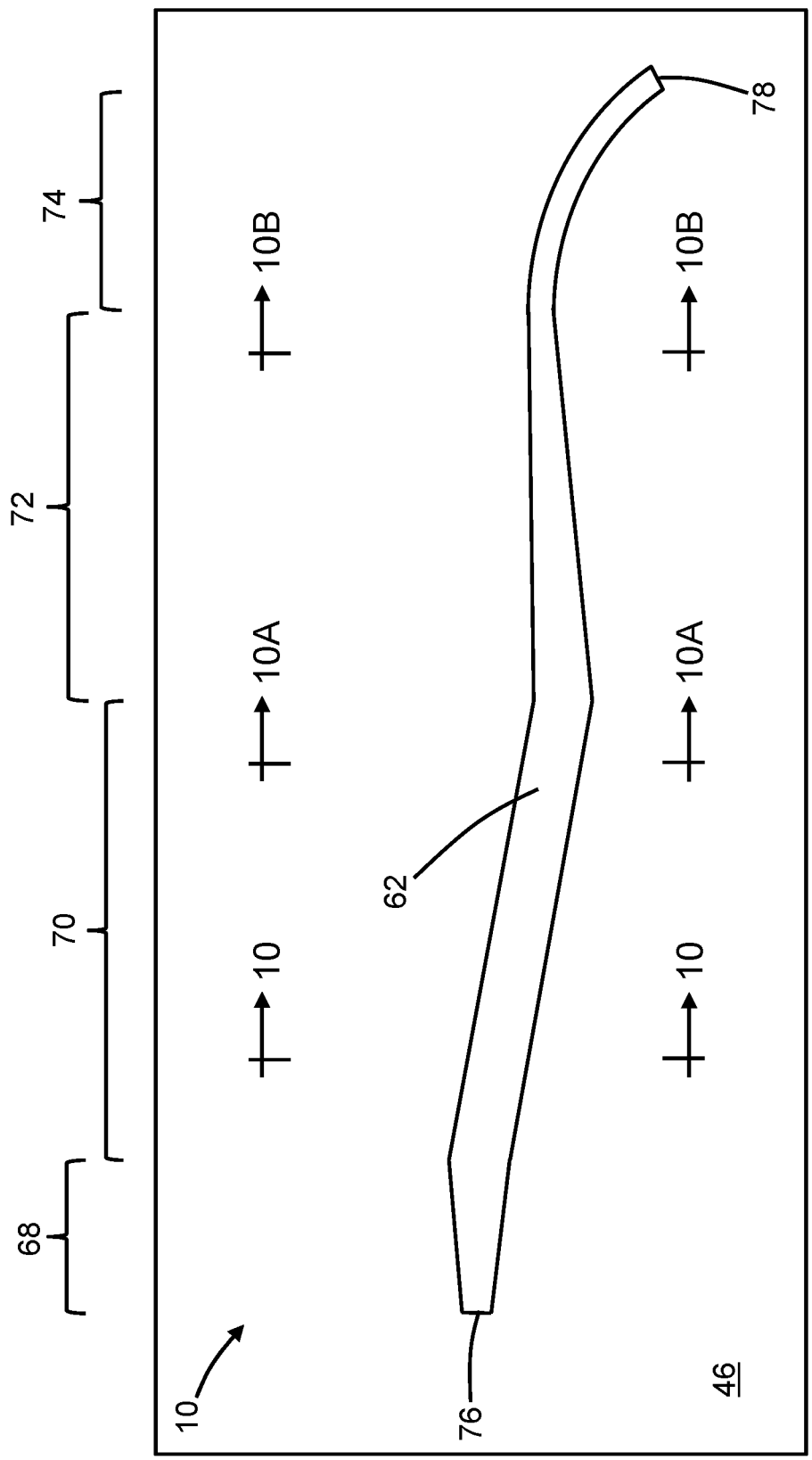
FIG. 9 is a top view of a structure in accordance with alternative embodiments of the invention.
Figure 10:
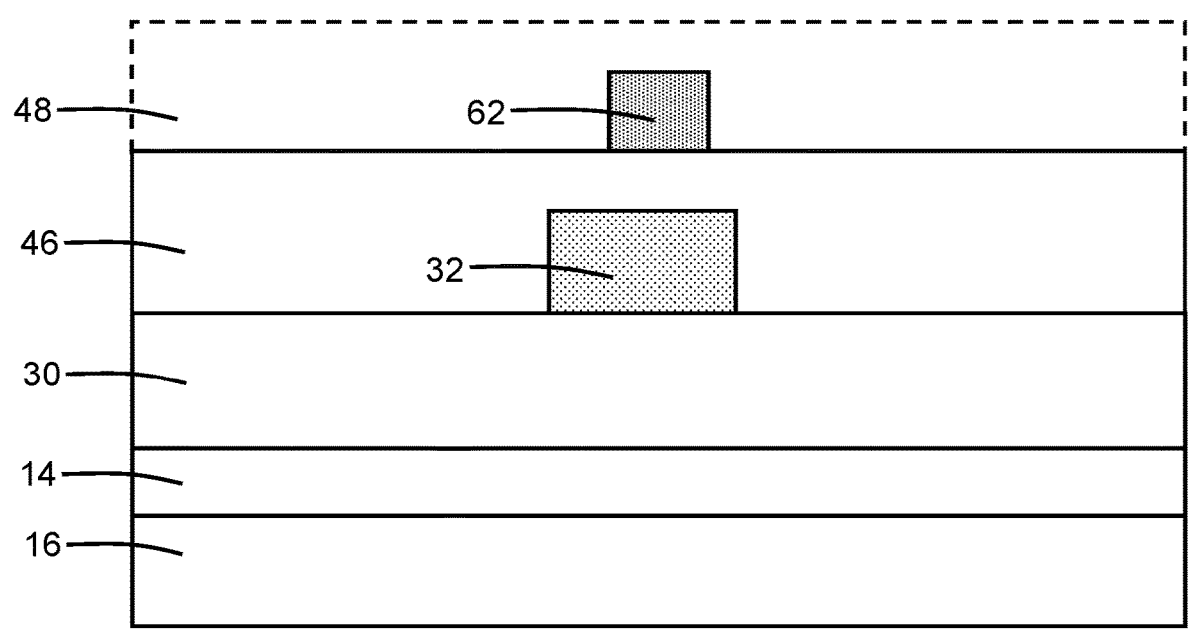
FIG. 10 is a cross-sectional view of the structure taken generally along line 10-10 in FIG. 9.
Figure 10A:
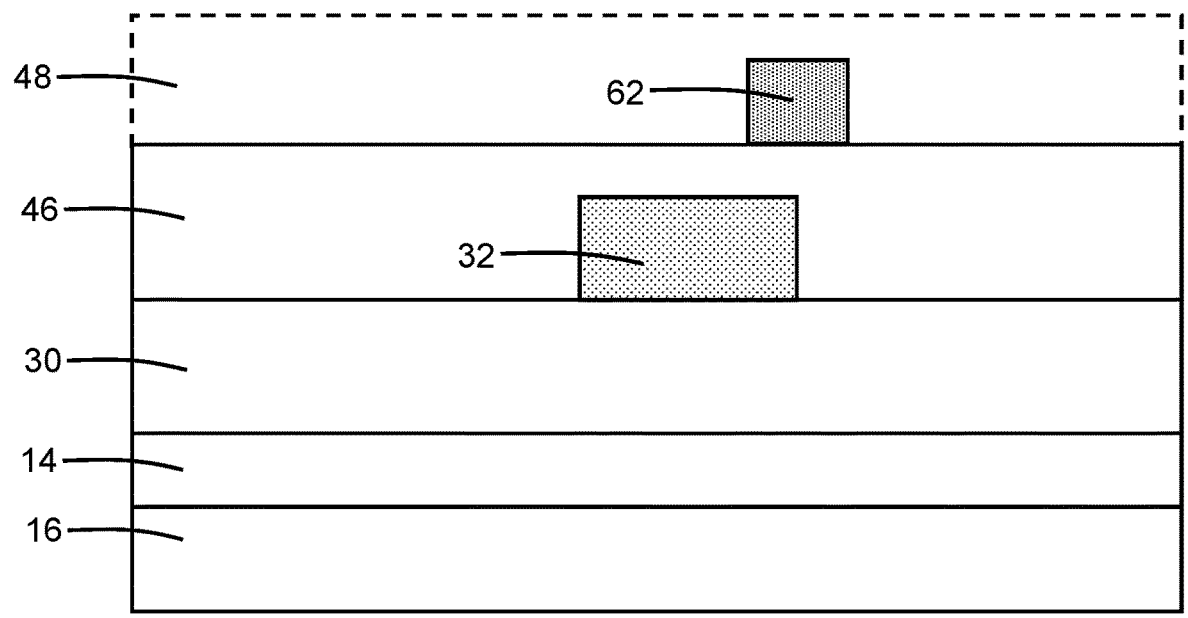
FIG. 10A is a cross-sectional view of the structure taken generally along line 10A-10A in FIG. 9.
Figure 10B:
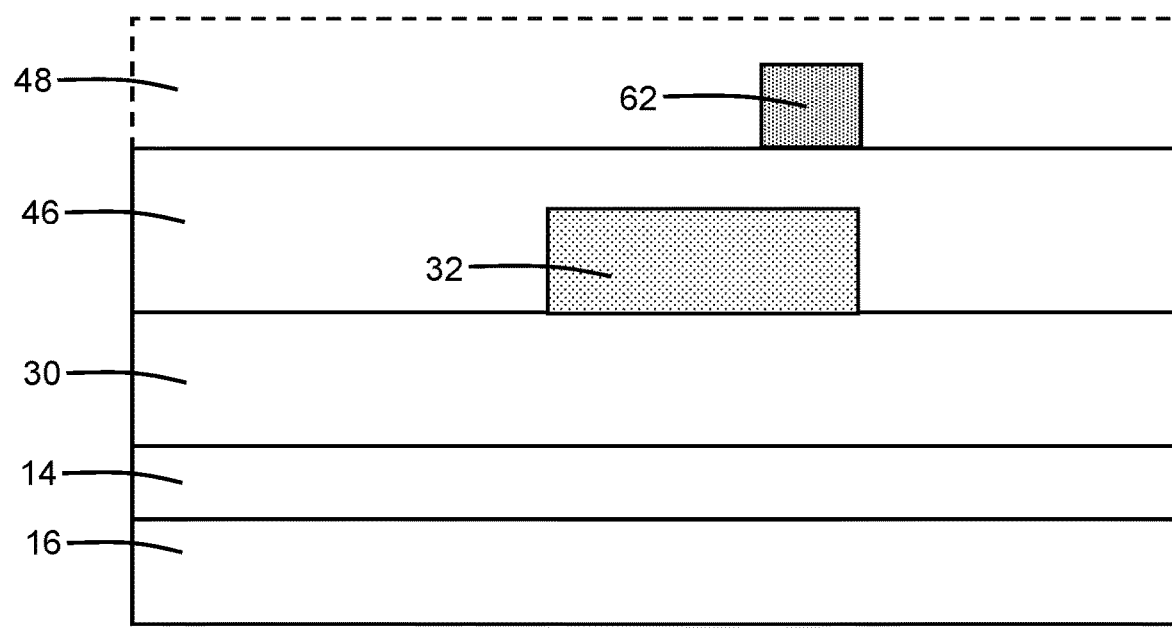
FIG. 10B is a cross-sectional view of the structure taken generally along line 10B-10B in FIG. 9.

With reference to FIG. 8 and in accordance with alternative embodiments of the invention, the structure 10 may include a waveguide core 60 that is positioned adjacent to the waveguide core 32 to define a slotted waveguide core over a portion of the length of the waveguide core 32. The waveguide core 60 is separated from the waveguide core 32 by a slot S2. The waveguide core 32 has a non-overlapping arrangement with the waveguide core 12. In an embodiment, the changes in direction at the transitions between the different sections of the waveguide core 60 may parallel the changes in direction of the sections 36, 38, 40 of the waveguide core 32 such that the slot S2 has a constant or substantially constant width dimension over the length of the waveguide core 60. In an embodiment, the waveguide core 60 may be comprised of the same material as the waveguide core 32 and may be concurrently formed with the waveguide core 32. The waveguide core 60 may lack a section analogous to the section 34 of the waveguide core 32 in order to avoid interference with the overlap between the section 18 of the waveguide core 12 and the section 34 of the waveguide core 32.

With reference to FIGS. 9, 10, 10A, 10B and in accordance with alternative embodiments of the invention, the structure 10 may include a waveguide core 62 that is positioned in the back-end-of-line stack 48. The waveguide core 62 is positioned over the waveguide core 32 such that the waveguide core 32 is positioned in a vertical direction between the waveguide core 62 and the substrate 16. The waveguide core 62 has a finite length extending between a terminating end 76 and a terminating end 78. The waveguide core 62 includes sections 68, 70, 72, and 74 that are identical or substantially identical to the sections 18, 20, 22, and 24 of the waveguide core 12, and the sections 68, 70, and 72 of the waveguide core 62 have respective overlapping arrangements with the sections 34, 36, and 38 of the waveguide core 32, as described hereinabove in connection with the waveguide core 12 and the waveguide core 32.

The waveguide core 62 may be comprised of a dielectric material, such as silicon-carbon nitride or hydrogenated silicon-carbon nitride, having a refractive index greater than the refractive index of silicon dioxide. In an alternative embodiment, the waveguide core 62 may be comprised of a dielectric material, such as silicon nitride, silicon oxynitride, or aluminum nitride. In an embodiment, the waveguide core 62 may be formed by depositing a layer of its constituent material on the dielectric layer 46 and patterning the deposited layer by lithography and etching processes.

In an embodiment, the waveguide core 62 may replace the waveguide core 12 in the structure 10. In an alternative embodiment, the structure 10 may include the waveguide core 62 and the waveguide core 12 such that the sections 34, 36, and 38 of the waveguide core 32 have respective overlapping arrangements with the sections 18, 20, 22 of the waveguide core 12 and the sections 68, 70, 72 of the waveguide core 62 have respective overlapping arrangements with the sections 34, 36, and 38 of the waveguide core 32. The combination of the waveguide core 12 and the waveguide core 62 in the structure 10 may further reduce the conversion loss, suppress polarization crosstalk, and improve the power handling capability of the polarization rotator.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a polarization rotator, the structure comprising:
   a substrate;
   a first waveguide core having a first section, a second section, a first terminating end, and a second terminating end opposite to the first terminating end, the first section and the second section arranged between the first terminating end and the second terminating end, and the first waveguide core comprising a first material; and
   a second waveguide core including a first tapered section, a second tapered section, a third tapered section adjoined to the first tapered section, and a non-tapered section adjoined to the second tapered section, the third tapered section configured as a light input of the polarization rotator to receive light of a first polarization, the non-tapered section configured as a light output to output light of a second polarization from the polarization rotator, the first tapered section of the second waveguide core having a first overlapping arrangement with the first section of the first waveguide core, the second tapered section of the second waveguide core having a second overlapping arrangement with the second section of the first waveguide core, and the second waveguide core comprising a second material different from the first material,
   wherein the first waveguide core is positioned between the second waveguide core and the substrate, and the first tapered section and the second tapered section are longitudinally arranged between the third tapered section and the non-tapered section.

2. The structure of claim 1 wherein the first material comprises single-crystal silicon, and the second material comprises silicon nitride or polysilicon.

3. The structure of claim 1 further comprising:
   a third waveguide core positioned adjacent to the first waveguide core, the third waveguide core separated from the first waveguide core by a slot.

4. The structure of claim 3 wherein the second waveguide core has a non-overlapping arrangement with the third waveguide core.

5. The structure of claim 4 wherein the second waveguide core has a non-overlapping arrangement with the slot.

6. The structure of claim 1 further comprising:
a dielectric layer positioned between the first waveguide core and the second waveguide core, the dielectric layer comprising a dielectric material.

7. The structure of claim 1 further comprising:
a dielectric layer positioned between the first waveguide core and the second waveguide core, the dielectric layer comprising a dielectric material.

8. The structure of claim 1 further comprising:
a back-end-of-line stack on the substrate,
wherein the second waveguide core is positioned in the back-end-of-line stack.

9. The structure of claim 8 wherein the second material is silicon-carbon nitride or hydrogenated silicon-carbon nitride.

10. The structure of claim 1 wherein the first section of the first waveguide core and the second section of the first waveguide core adjoin at a junction.

11. The structure of claim 10 wherein the first tapered section of the second waveguide core fully overlaps with the first section of the first waveguide core adjacent to the first terminating end, and the first tapered section of the second waveguide core partially overlaps with the first section of the first waveguide core adjacent to the junction.

12. The structure of claim 11 wherein the second tapered section of the second waveguide core fully overlaps with the second section of the first waveguide core adjacent to the junction, and the second tapered section of the second waveguide core partially overlaps with the second section of the first waveguide core adjacent to the second terminating end.

13. The structure of claim 10 wherein the second tapered section of the second waveguide core fully overlaps with the second section of the first waveguide core adjacent to the junction, and the second tapered section of the second waveguide core partially overlaps with the second section of the first waveguide core adjacent to the second terminating end.

14. The structure of claim 1 wherein the first tapered section of the second waveguide core is adjoined to the second tapered section of the second waveguide core at a junction.

15. The structure of claim 14 wherein the first tapered section of the second waveguide core increases in width dimension with decreasing distance from the junction, and the second tapered section of the second waveguide core increases in width dimension with increasing distance from the junction.

16. The structure of claim 1 wherein the second tapered section tapers in a same direction as the first tapered section, and the second tapered section has a larger taper angle than the first tapered section.

17. The structure of claim 16 wherein the first tapered section and the second tapered section each taper in an opposite direction from the third tapered section.

18. A structure for a polarization rotator, the structure comprising:
a substrate;
a first waveguide core having a first section, a second section, a first terminating end, and a second terminating end opposite to the first terminating end, the first section and the second section arranged between the first terminating end and the second terminating end, and the first waveguide core comprising a first material; and
a second waveguide core including a first tapered section, a second tapered section, and a third tapered section adjoined to the first tapered section, the third tapered section configured as a light input of the polarization rotator to receive light of a first polarization, the first tapered section of the second waveguide core having a first overlapping arrangement with the first section of the first waveguide core, the second tapered section of the second waveguide core having a second overlapping arrangement with the second section of the first waveguide core, and the second waveguide core comprising a second material different from the first material,
wherein the first waveguide core is positioned between the second waveguide core and the substrate, the first section of the first waveguide core and the second section of the first waveguide core adjoin at a junction, the first section of the first waveguide core is aligned along a first longitudinal axis, the second section of the first waveguide core is aligned along a second longitudinal axis, and the first longitudinal axis is angled relative to the second longitudinal axis at the junction.

19. A method of forming a structure for a polarization rotator, the method comprising:
forming a first waveguide core having a first section, a second section, a first terminating end, and a second terminating end opposite to the first terminating end, wherein the first section and the second section are arranged between the first terminating end and the second terminating end, and the first waveguide core comprises a first material; and
forming a second waveguide core including a first tapered section, a second tapered section, a third tapered section adjoined to the first tapered section, and a non-tapered section adjoined to the second tapered section, wherein the third tapered section is configured as a light input of the polarization rotator to receive light of a first polarization, the non-tapered section is configured as a light output to output light of a second polarization from the polarization rotator, the first tapered section of the second waveguide core has a first overlapping arrangement with the first section of the first waveguide core, the second tapered section of the second waveguide core has a second overlapping arrangement with the second section of the first waveguide core, the second waveguide core comprises a second material different from the first material, the first waveguide core is positioned between the second waveguide core and a substrate, and the first tapered section and the second tapered section are longitudinally arranged between the third tapered section and the non-tapered section.

* * * * *